(12) United States Patent
Horikiri

(10) Patent No.: US 7,986,302 B2
(45) Date of Patent: Jul. 26, 2011

(54) FUNCTION COMMAND SYSTEM, FUNCTION COMMAND DEVICE, FUNCTION COMMAND ANALYSIS SYSTEM, PRESENTATION SYSTEM, AND COMPUTER READABLE MEDIUM

(75) Inventor: Kazunori Horikiri, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1116 days.

(21) Appl. No.: 11/741,291

(22) Filed: Apr. 27, 2007

(65) Prior Publication Data

US 2008/0024443 A1    Jan. 31, 2008

(30) Foreign Application Priority Data

Jul. 26, 2006 (JP) ................. P2006-202824

(51) Int. Cl.
G06F 3/033    (2006.01)
(52) U.S. Cl. .................. 345/157; 345/156
(58) Field of Classification Search ........... 345/156–184
See application file for complete search history.

(56) References Cited

U.S. PATENT DOCUMENTS

| | | | |
|---|---|---|---|
| 7,039,253 B2 * | 5/2006 | Matsuoka et al. | 345/183 |
| 7,193,608 B2 * | 3/2007 | Stuerzlinger | 345/156 |
| 7,766,486 B2 * | 8/2010 | Sakai | 353/69 |
| 2001/0045940 A1 * | 11/2001 | Hansen | 345/158 |
| 2003/0011566 A1 | 1/2003 | Gomi et al. | |
| 2003/0210230 A1 | 11/2003 | Waters | |
| 2004/0001043 A1 | 1/2004 | Lin | |
| 2004/0041786 A1 | 3/2004 | Inoue et al. | |
| 2004/0239653 A1 | 12/2004 | Stuerzlinger | |

FOREIGN PATENT DOCUMENTS

| | | | |
|---|---|---|---|
| JP | 2000-81950 A | 3/2000 | |
| JP | 2003-36142 A | 2/2003 | |

OTHER PUBLICATIONS

Australian Office Action dated Mar. 24, 2009.
Australian Office Action dated Oct. 22, 2008.

* cited by examiner

*Primary Examiner* — Nitin Patel
(74) *Attorney, Agent, or Firm* — Sughrue Mion, PLLC

(57) ABSTRACT

A function command analysis system includes an image input unit, a position information extraction unit, a function command specification unit and a function command output unit. The image input unit inputs an image containing an image generated by light emitted from a light emission device. The position information extraction unit extracts position information of the image, which is generated by the light emitted from the light emission device emits, from the image input by the image input unit. The function command specification unit extracts a mode of the image, which is generated by the light emitted from the light emission device, from the image input by the image input unit to specify a function command input by an operator. The function command output unit outputs the position information extracted by the position information extraction unit and the function command extracted by the function command specification unit.

10 Claims, 4 Drawing Sheets

| PATTERN | LASER POINTER IDENTIFIER |
|---|---|
| ■ | 1 |
| — | 2 |
| \| | 3 |
| ○ | 4 |
| ⋮ | ⋮ |

| COLOR | FUNCTION |
|---|---|
| RED | SCROLL |
| GREEN | COPY |
| ⋮ | ⋮ |

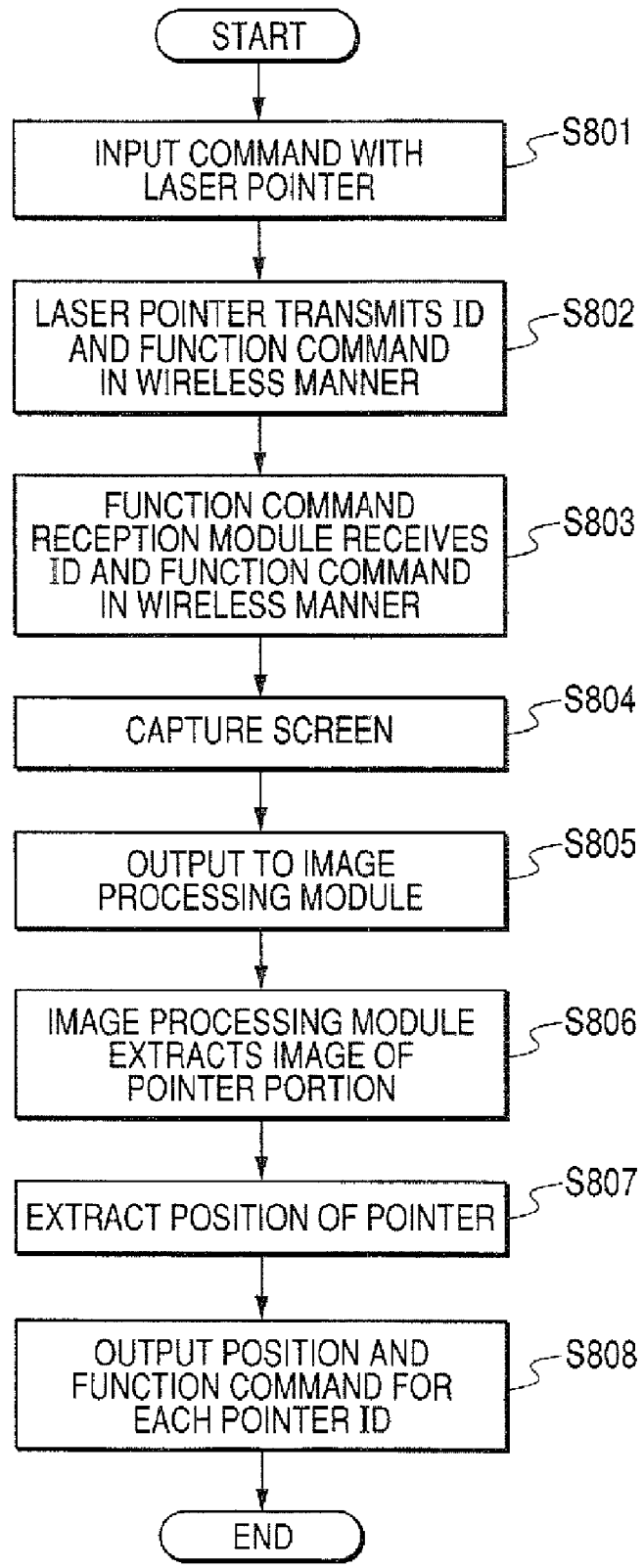

US 7,986,302 B2

FUNCTION COMMAND SYSTEM, FUNCTION COMMAND DEVICE, FUNCTION COMMAND ANALYSIS SYSTEM, PRESENTATION SYSTEM, AND COMPUTER READABLE MEDIUM

CROSS-REFERENCE TO RELATED APPLICATIONS

This application is based on and claims priority under 35 U.S.C. §119 from Japanese Patent Application No. 2006-202824 filed Jul. 26, 2006.

BACKGROUND

1. Technical Field

The invention relates to a function command system, a function command device, a function command analysis system, a presentation system, and a computer readable medium storing a function command analysis program and a compute data signal.

2. Related Art

A presentation system for displaying, etc., a previously created electronic document on a shared large-sized display is used in a conference, a lecture, a presentation, etc. As the presentation system, a computer using system is available for displaying an image generated from an electronic document using a computer with a liquid crystal projector, etc.

SUMMARY

According to an aspect of the invention, a function command analysis system includes an image input unit, a position information extraction unit, a function command specification unit and a function command output unit. The image input unit inputs an image containing an image generated by light emitted from a light emission device. The position information extraction unit extracts position information of the image, which is generated by the light emitted from the light emission device emits, from the image input by the image input unit. The function command specification unit extract a mode of the image, which is generated by the light emitted from the light emission device, from the image input by the image input unit to specify a function command input by an operator. The function command output unit outputs the position information extracted by the position information extraction unit and the function command extracted by the function command specification unit.

BRIEF DESCRIPTION OF THE DRAWINGS

Exemplary embodiments of the invention will be described in detail below with respect to the accompanying drawings, wherein:

FIG. 8 is a flowchart to show a processing example of the presentation system of the second exemplary embodiment.

DETAILED DESCRIPTION

Referring now to the accompanying drawings, exemplary embodiments of the invention will be described.

FIGS. 1 to 6 show a first exemplary embodiment of the invention.

A module described with the accompanying drawings, etc., refers generally to a logically detachable component of software, hardware, etc. Therefore, the module in the exemplary embodiments means not only a module in a program, but also a module in the hardware configuration. Therefore, the exemplary embodiments described below also serve as the description of a program, a system, a method, a computer readable medium storing the program and a computer data signal. Modules are almost in a one-to-one correspondence with functions; however, in implementation, one module may be one program or two or more modules may make up one program or two or more programs may make up one module. Two or more modules may be executed by one computer or one module may be executed in two or more computers in a distributed or parallel environment. In the description to follow, the term "connection" contains not only physical connection, but also logical connection.

The system is not only provided by connecting plural computers, hardware components, units, etc., through a network, etc., but also implemented as a single computer.

The exemplary embodiments described below illustrate mainly that a presentation system is used in a conference (including a lecture, a presentation, etc.,).

Figure 2:
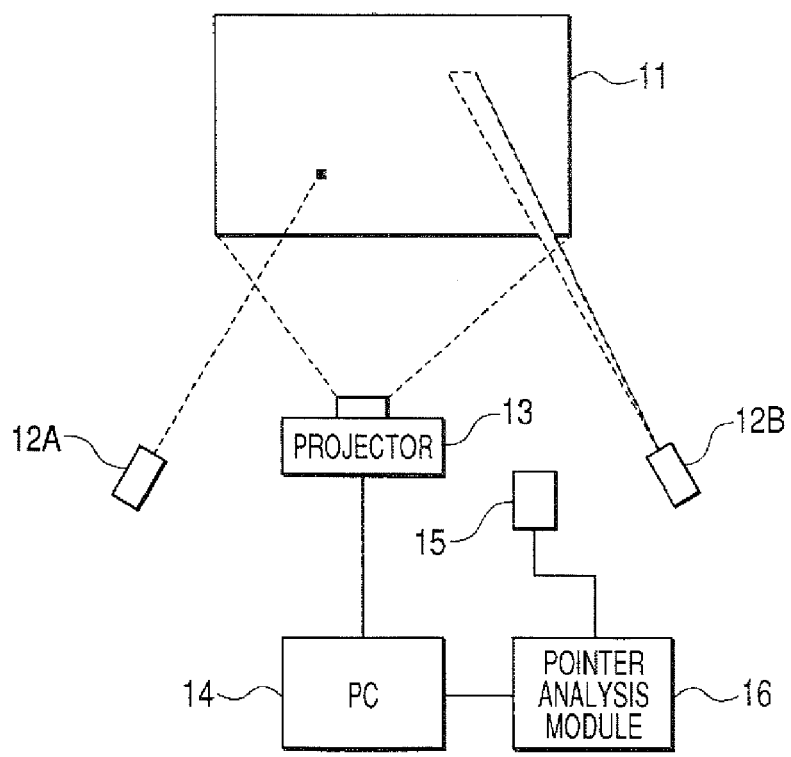
FIG. 2 is a block diagram to schematically show a general example where the presentation system is used.

To begin with, a general outline example where a presentation system of the exemplary embodiment (first exemplary embodiment, second exemplary embodiment) is used will be described with reference to FIG. 2.

The presentation system includes a screen 11, a laser pointer 12A, a laser pointer 12B, a projector 13, a PC (personal computer) 14, a camera 15, and a pointer analysis module 16. The number of the laser pointers is not limited to two. The presentation system may include more than two laser pointers or only one laser pointer.

The projector 13 is a device for projecting an image onto the screen 11. The image to be projected is supplied by the PC 14. The projector 13 and the CP 14 are connected by a cable, etc.

The screen 11 may be a movie screen for displaying the image projected by the projector 13 or may be a liquid crystal display, a plasma display, etch, capable of displaying an image produced by the PC 14.

The laser pointers 12A and 12B are used in place of pointing rods in a conference using the projector 13. If the operator presses a button with the laser pointer directed to the screen 11 (including a wall, etc.,), a light image of a laser beam is displayed on the screen 11.

For example, a pen-type laser pointer or a laser pointer of a TV remote control type is available as the laser pointer 12A, 12B. To input a function command, the pen-type laser pointer may be a laser pointer for a user to press a button (once the button is pressed, the pressed state is held until the pressed state is released), may be a laser pointer for the user to depress a button (when the operator depresses the button, a function command is input, but if the operator's finger detaches from the button, the depressed state is released), may be a laser pointer for the user to rotate a shaft, or the like. To input a function command, the laser pointer of the TV remote control type may be a laser pointer for the user to depress a button or the like.

The PC 14 is connected to the projector 13 and the pointer analysis module 16 and supplies an image generated by presentation software running on the PC 14 to the projector 13. The PC 14 gives a command to the presentation software running at the time in response to a command of the operator who operates the PC 14 (often, presenter) or a function command supplied from the pointer analysis module 16. The command mentioned here is a command that can be interpreted by the presentation software operate as instructed; specifically it is page feed, scroll, etc., for example.

The camera 15 captures the screen 11. That is, since an image projected from the projector 13 and images generated by the laser pointers 12A, 12B are displayed on the screen 11, the camera 15 captures those images as a digital image. The camera 15 may be a digital camera for photographing a still image or may be a video camera for imaging a moving image. The camera 15 is connected to the pointer analysis module 16 and supplies a captured digital image to the pointer analysis module 16.

The pointer analysis module 16 is connected to the camera 15 and the PC 14 and extracts an image generated by the laser pointer 12A or 12B from the image captured by the camera 15. The pointer analysis module 16 interprets the extracted image and gives a command to the presentation software running on the PC 14. This will be described later. In FIG. 2, the pointer analysis module 16 has an independent casing and is connected to the camera 15 and the PC 14, but may be incorporated in the PC 14 or the camera 15.

Figure 1:
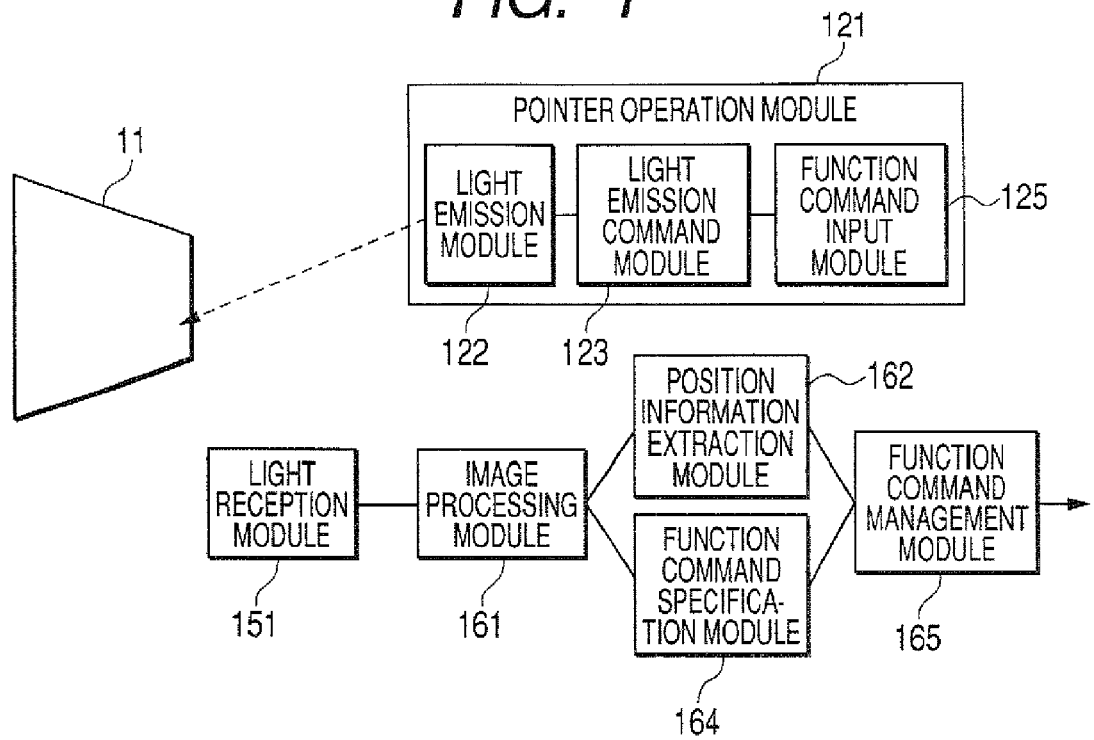
FIG. 1 is a block diagram to show a configuration example of a first exemplary embodiment of a presentation system.

A configuration example of the first exemplary embodiment of the presentation system will be described with reference to reference to FIG. 1. The presentation system has the screen 11, a pointer operation module 121, a light reception module 151, an image processing module 161, a position information extraction module 162, a function command specification module 164, and a function command management module 165. Further, the pointer operation module 121 has a light emission module 122, a light emission command module 123, and a function command input module 125. The pointer operation module 121 is included in each of the laser pointers 12A and 12B previously described with reference to FIG. 2. Likewise, the light reception module 151 is included in the camera 15 and the image processing module 161, the position information extraction module 162, the function command specification module 164, and the function command management module 165 are included in the pointer analysis module 16. In the exemplary embodiment, the pointer operation module 121 is a main component of the laser pointer 12A, 12B and applies a laser beam, etc., to the screen 11 in accordance with a command of the operator and changes an image generated accordingly.

The function command input module 125 is connected to the light emission command module 123 and serves as a user interface with the operator who handles the laser pointer 12A, 12B. This means that operator's operation on buttons of the laser pointer 12A, 12B is sent to the light emission command module 123. Specifically, an identifier of the button indicating which button is pressed is sent to the light emission command module 123.

The light emission command module 123 controls the light emission module 122 to emit a laser beam, etc. At this time, a mode of light emission, that is, a mode of an image generated by the laser beam, etc., (shape, color, pattern, light emission period, etc.,) is changed in response to the identifier sent from the function command input module 125. The light emission module 122 can emit not only a laser beam, but also infrared radiation. The laser beam is visible light for a human being and an image generated on the screen 11 is also visible; the infrared radiation is invisible light for a human being and an image generated on the screen 11 is invisible for a human being, but if the image is captured by the camera 15, the infrared radiation image can be captured. The light emission module 122 may be a module for emitting only a laser beam. If the light emission module 122 is a module capable of emitting infrared radiation as well as a laser beam, the number of functions that can be specified by the operator increases. The identifier of the laser pointer 12A, 12B, etc., can also be generated by emitting a laser beam or infrared radiation. This means that the function, the identifier, etc., can be specified using an image generated by emitting a laser beam and an image generated by emitting infrared radiation in combination.

The light reception module 151 is included in the camera 15 for capturing the screen 11. The image projected by the projector 13 and the image generated by the laser pointer 12A, 12B are displayed on the screen 11 as described above. The light reception module 151 captures the images as a digital image. The light reception module 151 passes the captured digital image to the image processing module 161 of the pointer analysis module 16 to which the light reception module 151 (the camera 15) is connected.

The image processing module 161 is connected to the light reception module 151, the position information extraction module 162, and the function command specification module 164. The image processing module 161 first executes affine transformation for the digital image passed from the light reception module 151. That is, depending on the position relation between the camera 15 and the screen 11, the captured screen 11 in the captured image may be a trapezoid regardless of the generally rectangular screen 11. To restore it to the original rectangle, the image transformation is performed. The digital images subjected to the affine transformation are stored in time series. A digital image at one time and a later digital image are stored.

Then, the image processing module 161 detects a difference between the stored digital images. A difference occurs in the digital image when the image projected by the projector 13 changes (for example, when the next page is displayed by presentation software, etc.,) or when a laser beam, etc., is emitted from the laser pointer 12A or 12B.

If the differential image occupies most of the area, the image processing module 161 recognizes that the image projected by the projector 13 changes. The image processing module 161 counts and stores this event with time information. It is later analyzed, whereby it is made possible to know how the presentation software is used in a conference.

If the differential image is a predetermined area or less, the image processing module 161 recognizes that a laser beam, etc., is emitted from the laser pointer 12A or 125. The mode of the differential image is extracted. This means that the image processing module 161 extracts the color, the shape, the size, etc., of the differential image. The differential image is an image generated by the laser pointer 12A or 12B and is generated by the operator's operation on the laser pointer 12A or 12B.

The image processing module 161 passes the extraction result of the differential image to the position information extraction module 162 and the function command specification module 164. The result occurs in time series and therefore is passed to the position information extraction module 162 and the function command specification module 164 in time sequence.

The position information extraction module 162 extracts position information in the screen 11 from the differential image passed from the image processing module 161. The position information is handled as if it were like position information specified by a pointing device such as a mouse of the PC 14 for the presentation software in the PC 14. This means that it is made possible to cause the presentation software to move a cursor using the laser pointer 12A, 12B. The position information extraction module 162 may extract position information in the image projected by the projector 13 rather than the position information in the screen 11. The position information extraction module 162 passes the position information which is the extraction result to the function command management module 165. Also, in this case, the position information is passed to the function command management module 165 in time series.

The function command specification module 164 specifies the function, etc., designated by the operator of the laser pointer 12A or 12B from the differential image passed from the image processing module 161. The differential image is a pattern of the screen 11 generated by emitting a laser beam, etc. The extraction is executed as follows.

Figures 5, 6, 7:
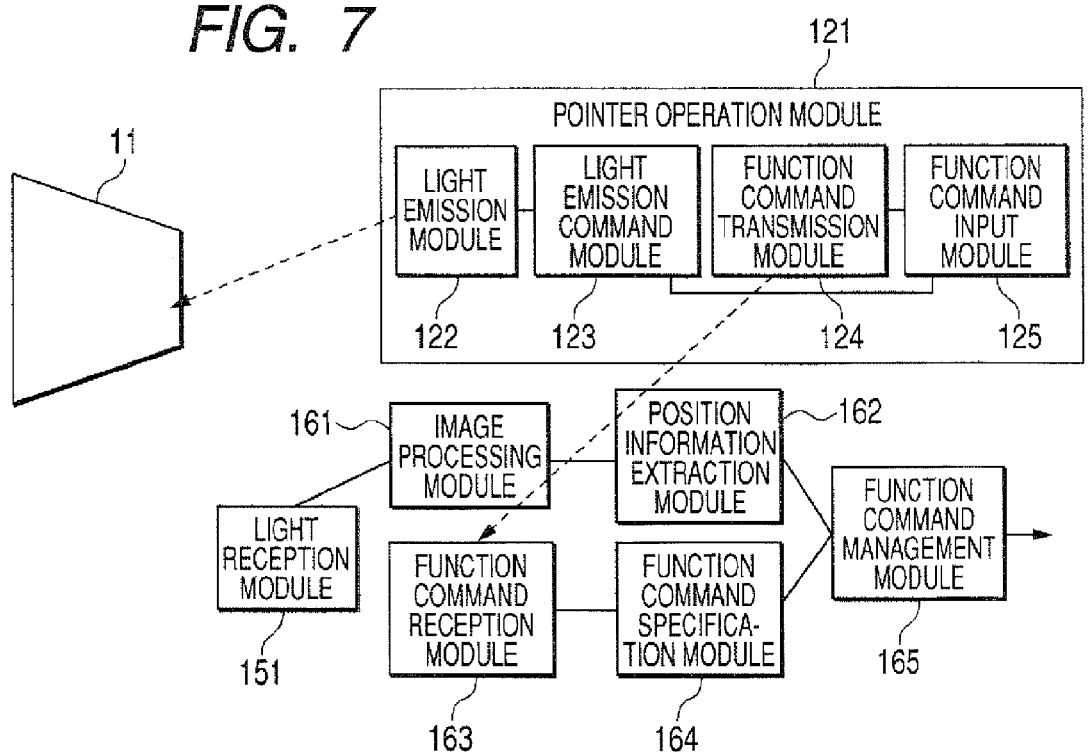
FIG. 5 is a drawing to describe a data structure represented as a correspondence relation between laser patterns and laser pointer identifiers.
FIG. 6 is a drawing to describe a data structure represented as a correspondence relation between laser colors and functions.
FIG. 7 is a block diagram to show a configuration example of a second exemplary embodiment of a presentation system.

The function command specification module 164 recognizes the mode of the differential image using an image recognition technology of pattern matching, etc. Then, the function command specification module 164 specifies a function that the mode means. To do this, the function command specification module 164 stores a correspondence table between patterns of the screen 11 generated by emitting a laser beam and laser pointer identifiers and a correspondence table between laser beam colors and functions. For example, FIG. 5 shows an example of the correspondence table between patterns of the screen 11 generated by emitting a Laser beam and laser pointer identifiers. Also, FIG. 6 shows an example of the correspondence table between laser beam colors and functions.

The correspondence table between patterns of the screen 11 generated by emitting a laser beam and laser pointer identifiers will be described with reference to FIG. 5. If plural laser pointers are included in the presentation system, to distinguish one laser pointer from another, it is defined in advance that a point is drawn on the screen 11 by a laser beam as laser pointer identifier 1, that a lateral line is drawn as laser pointer identifier 2, that a vertical line is drawn as laser pointer identifier 3, and that a circle is drawn as laser pointer identifier 4. The light emission command module 123 previously determines what pattern is to be generated by each of the laser pointers. In other words, when the shape of the differential image is recognized, it can be found which laser pointer is used to input the command.

The correspondence table between laser beam colors and functions will be described with reference to FIG. 6. If the color of the differential image is red, the correspondence table indicates that a scroll function is specified; if the color of the differential image is green, the correspondence table indicates that a copy function is specified. The light emission command module 123 also sets the correspondence indicating laser light of what color is to be generated if what button (function) is pressed.

The correspondence tables are not limited to those in FIGS. 5 and 6. For example, by using infrared radiation as well as a laser beam, the function command specification module 164 can also store a correspondence table for infrared radiation like that in FIG. 5. In this case, infrared radiation pattern information also increases and thus it is made possible to identify a larger number of pieces of information. If an infrared radiation pattern is captured with the camera 15, it is captured in white and can be distinguished from a laser beam pattern.

The function command specification module 164 passes information concerning the specified function command (for example, function and/or laser pointer identifier) to the function command management module 165. Also, in this case, the information is passed to the function command management module 165 in time series.

The function command management module 165 is connected to the position information extraction module 162 and the function command specification module 164, and receives the position information from the position information extraction module 162 and the information concerning the function command (specification) from the function command specification module 164 in time sequence.

Then, the function command management module 165 associates the position information from the position information extraction module 162 and the information concerning the function command (specification) from the function command specification module 164 with each other to output to the PC 14. In other words, the command is given to the presentation software using the laser pointer 12A, 12B. The presentation software executes processing based on the command.

A hardware configuration example of a computer used in the pointer analysis module 16 will e described with reference to FIG. 3. This hardware configuration example is common to a second exemplary embodiment (described later) and therefore will not be described again in the description of the second exemplary embodiment. The hardware of the computer has a CPU 31, RAM 32, ROM 33, an interface 34, image memory 35, an HD 36, a user interface 37, and a bus 39. It may be a computer as a dedicated machine or may be a general personal computer, etc.

The CPU 31 (Central Processing Unit) is a control section for executing processing following a computer program describing the execution sequence of the modules described above in the exemplary embodiment, namely, the modules of the image processing module 161, the position information extraction module 162, the function command specification module 164, etc.

The RAM 32 (Random Access Memory) stores programs used in execution of the CPU 31 and parameters, etc., changed as appropriate with the execution. The ROM 33 (Read-Only Memory) stores programs, computation parameters, etc., used by the CPU 31

The image memory 35 stores the digital image received from the light reception module 151 and also stores the target to which the image processing module 161 applies image processing. The image memory 35 generally is implemented as RAM and may be dedicated memory and can also be replaced with the RAM 32.

The user interface 37 is an interface with an input device operated by the operator, an output device for producing display for the operator, and the like. For example, a pointing device of a keyboard, a mouse, etc., is available as the input device. A display such as a liquid crystal display or a CRT (Cathode Ray Tube) is available as the output device.

The HD 36 (Hard Disk) is provided for recording or playing back programs and information executed by the CPU 31. The digital image, etc., stored in the image memory 35 is stored on the hard disk 36. Further, various computer programs including various data processing programs, etc., are stored on the hard disk 36.

The interface 34 is a port for connecting external connection machines and has a connection section of USB, IEEE 1394, etc. For example, the interface 34 connects the pointer analysis module 16, the PC 14 and the camera 15.

The components are interconnected by the bus 39.

Figure 3:
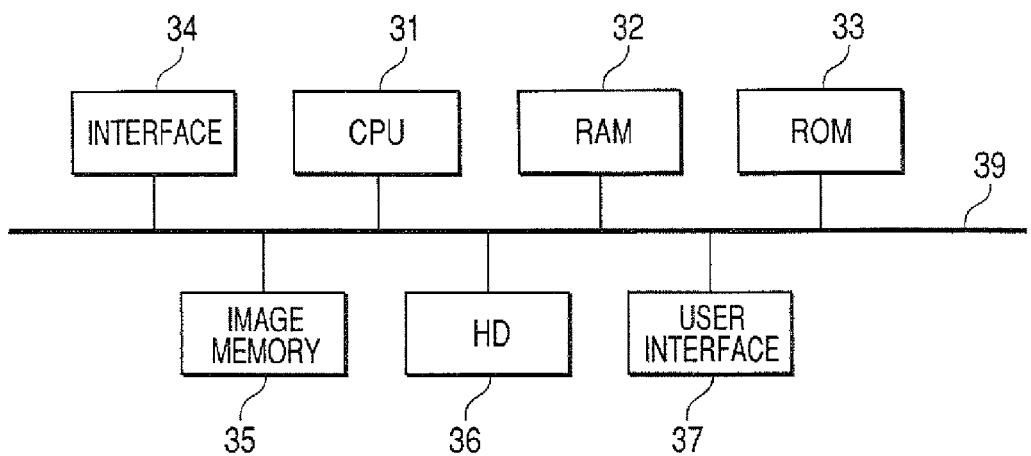
FIG. 3 is a block diagram to show a hardware configuration example of a computer used in the presentation system.

The hardware configuration shown in FIG. 3 shows one configuration example and the exemplary embodiment is not limited to the configuration shown in FIG. 3 and any configuration may be adopted if it makes it possible to execute the modules described in the exemplary embodiment. For example, some modules s may be implemented as dedicated hardware (for example, an ASIC, etc.,) and some modules may be included in an external system and may be connected via a communication line and further a plurality of systems shown in FIG. 3 may be connected via a communication line so as to operate in cooperation with each other. The system maybe built in the PC 14 or the camera 15, in which case, as the CPU 31, the RAM 32, etc., those in the PC 14 or the camera 15 may be used.

Next, the operation of the first exemplary embodiment will be described below.

Figure 4:
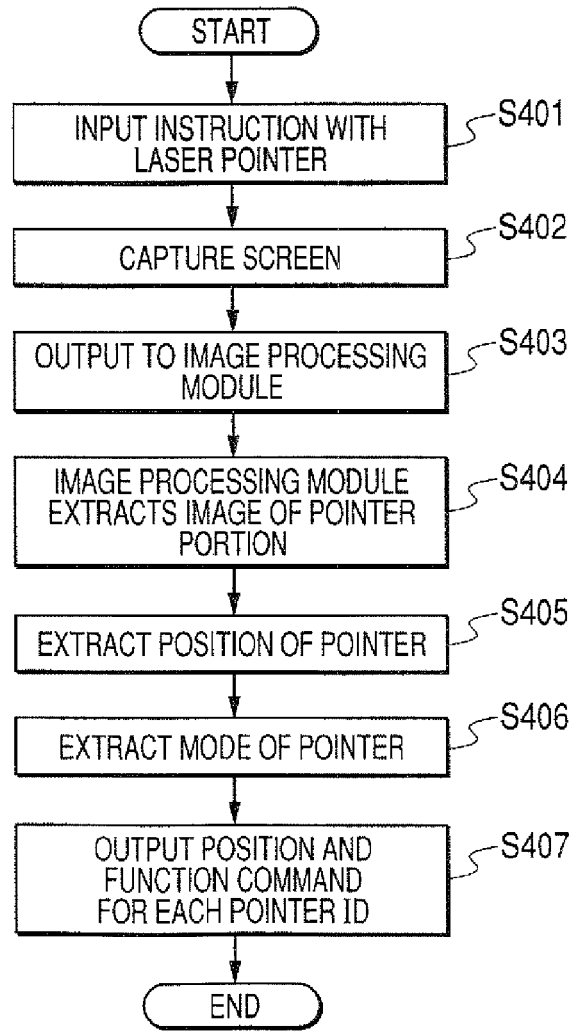
FIG. 4 is a flowchart to show a processing example of the presentation system of the first exemplary embodiment.

A processing example of the presentation system of the first exemplary embodiment will be described with reference to FIG. 4.

In a conference, a speaker projects a presentation document onto the screen 11 from the projector 13 using the PC 14. It is assumed that several conference participants exist in addition to the speaker. Each participant also has a laser pointer and can operate the presentation software.

At step S401, one or more participants generate an image on the screen 11 using the laser pointer 12A or 12B. For example, the participant may want to display the page preceding the current page displayed on the screen 11. Two or more participants may operate the laser pointer at the same time. It is assumed that a red laser beam is emitted using the laser pointer 12A (the identifier of the laser pointer is 1) for example.

At step S402, the screen 11 is captured by the camera 15.

At step S403, the camera 15 outputs the captured digital image to the image processing module 161.

At step S404, the image processing module 161 performs transformation processing of the target digital image from the trapezoid into a rectangle or the like and then extracts a differential image. In the example, a red point image is extracted as the differential image.

At step S405, the position information extraction module 162 extracts position information of the differential image.

At step S406, the function command specification module 164 extracts the mode of the image on the screen 11 generated by the laser pointer 12A or 12B. In other words, the function command specification module 164 specifies information concerning the function command of the operator who handles the laser pointer 12A or 12B using the correspondence tables previously described with reference to FIGS. 5 and 6. In the example, here it is found that the identifier of the laser pointer is 1 and that the command is a scroll command.

At step S407, the function command management module 165 associates the position information and the information concerning the function command extracted at steps S405 and S406 with each other and collects the information for each laser pointer identifier to output to the PC 14. In the example, output to the PC 14 is information indicating that the command is issued by the laser pointer having the identifier 1 and is to scroll a document located at a certain position.

Thereafter, the PC 14 passes the position information and the information concerning the function command collected for each laser pointer identifier to the presentation software, which then operates in accordance with the passed information. The result is projected onto the screen 11 through the projector 13. In the example, the document located at the certain position is scrolled. When scrolling the document, the fact that the command is input by the laser pointer identifier 1 may be displayed on the screen 11.

FIGS. 7 and 8 show the second exemplary embodiment of the invention. Parts identical with or similar to those previously described in the first exemplary embodiment are denoted by the same reference numerals in the second exemplary embodiment and will not be described again.

A configuration example of the second exemplary embodiment of a presentation system will be described with reference to FIG. 7. The presentation system has a screen 11, a pointer operation module 121, a light reception module 151, an image processing module 161, a position information extraction module 162, a function command reception module 163, a function command specification module 164 and a function command management module 165. Further, the pointer operation module 121 has a light emission module 122, a light emission command module 123, a function command transmission module 124, and a function command input module 125 The pointer operation module 121 is included in each of the laser pointers 12A and 12B previously described with reference to FIG. 2. Likewise, the light reception module 151 is included in a camera 15 and the image processing module 161, the position information extraction module 162, the function command reception module 163, the function command specification module 164 and the function command management module 165 are included in a pointer analysis module 16. In the exemplary embodiment, the pointer operation module 121 is a main component of the laser pointer 12A, 12B and emits a laser beam, etc., to the screen 11 in accordance with a command of the operator and changes an image produced accordingly and further transmits information concerning a function command to the function command reception module 163.

The function command input module 125 is connected to the light emission command module 123 and the function command transmission module 124 and serves as a user interface with the operator who handles the laser pointer 12A, 12B. In other words, operator's operation on buttons of the laser pointer 12A, 12B is sent to the light emission command module 123 and the function command transmission module 124. Specifically, the function command input module 125 notifies emission of a laser beam, etc., to the light emission command module 123 and also notifies an identifier of the button indicating which button is pressed to the function command transmission module 124.

The light emission command module 123 controls the light emission module 122 to emit a laser beam, etc.

The function command transmission module 124 transmits information concerning the function to the function command reception module 163. At this time, the information may be transmitted in a wired manner; preferably, the information is transmitted in a wireless manner on operation of the laser pointer. More specifically, communication means with infrared radiation based on IrDA (Infrared Data Association) standard or the like may be used.

The image processing module 161 is similar to the image processing module in the first exemplary embodiment; it is only connected to the light reception module 151 and the position information extraction module 162.

The function command reception module 163 receives the information concerning the function transmitted from the function command transmission module 124 and passes the information to the function command specification module 164.

Next, the operation in the exemplary embodiment is as follows:

A processing example of the presentation system of the second exemplary embodiment will be described with reference to FIG. 8. Steps identical with those previously described with reference to FIG. 4 in the processing example in the first exemplary embodiment are indicated by citing the step numbers in FIG. 4.

Step S801 is similar to step S401.

At step S802, the function command transmission module 124 transmits information concerning the function of the extraction result (function command, laser pointer identifier) to the function command reception module 163 in a wireless manner.

At step S803, the function command reception module 163 receives the information transmitted at step S802.

Step S804 is similar to step S402.
Step S805 is similar to step S403.
Step S806 is similar to step S404.
Step S807 is similar to step S405

At step S808, the function command management module 165 associates the position information and the information concerning the function command extracted at steps S803 and S807 with each other and collects the information for each laser pointer identifier for output to the PC 14.

In the second exemplary embodiment, the function command reception module 163 receives the function command transmitted from the laser pointer and the information concerning the function is extracted only from the received information. However, as in the first exemplary embodiment, the laser pointer may change the mode of light emission in response to the function command and the pointer analysis module 16 may extract the information concerning the function from the mode of the image produced by emitting a laser beam, etc., on the screen 11. In this case, the information concerning the function undergoes double check. Further, the specified function (function command) appears as an image on the screen 111 for the participants.

The described program may also be stored on a recording medium. In this case, the computer readable medium may be configured as below.

A computer readable medium stores a program causing a computer to execute a process for analyzing a function command. The process includes: inputting an image containing an image generated by light emitted from a light emission device; extracting position information of the image, which is generated by the light emitted from the light emission device emits, from the input image; extracting a mode of the image, which is generated by the light emitted from the light emission device, from the input image to extract a function command input by an operator; and outputting the extracted position information and the extracted function command.

A computer readable medium stores a program causing a computer to execute a process for analyzing a function command. The process includes: inputting an image containing an image generated by light emitted from a light-emission command transmitter; extracting position information of the image generated by the light, which is emitted from the light-emission command transmitter, from the input image; receiving a function command transmitted from the light-emission command transmitter; and outputting the extracted position information and the received function command.

The expression "computer-readable (recording) medium storing a program" is used to mean a recording medium that records a program and can be read by a computer, used to install and execute a program, to distribute a program, etc.

The record media include "DVD-R, DVD-RW, DVD-RAM, etc.," of digital versatile disk (DVD) and standard laid down in DVD Forum, "DVD+R, DVD+RW, etc.," of standard laid down in DVD+RW, read-only memory (CD-ROM), CD recordable (CD-R), CD rewritable (CD-RW), etc., of compact disk (CD), magneto-optical disk, flexible disk (FD), magnetic tape, hard disk, read-only memory (ROM), electrically erasable and programmable read-only memory (EEPROM), flash memory, random access memory (RAM) etc., for example.

The described program or a part thereof can be recorded in any of the described record media for retention, distribution, etc. The described program or a part thereof can also be transmitted by communications using a transmission medium such as a wired network used with a local area network, a metropolitan area network (MAN), a wide area network (WAN), the Internet, an intranet, an extranet, etc., or a wireless communication network or a combination thereof, etc., for example, and can also be carried over a carrier wave.

Further, the described program may be a part of another program or may be recorded in a recording medium together with a different program.

The foregoing description of the exemplary embodiments of the invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A function command analysis system comprising:
    an image input unit that inputs an image containing a plurality of images respectively generated by light emitted from a corresponding plurality of light emission devices;
    a position information extraction unit that extracts position information of the images that are respectively generated by the light emitted from the light emission device, from a differential image generated from the images input by the image input unit;
    a function command specification unit that extracts, for each image generated by the light emitted from a respective one of the light emission devices, a plurality of modes of the image, wherein for a given one of the images the plurality of modes includes:
        (i) a first mode indicative of a function command input by an operator; and
        (ii) a second mode indicative of which of the plurality of light emission devices emitted light for generating that image; and
    a function command output unit that outputs, in respect of each image, data indicative of the light emission device that emitted light for generating that image, the position information extracted by the position information extraction unit and the function command specified by the function command specification unit.

2. A function command system comprising:
a function command input unit that inputs a function command in accordance with an operator's operation;
a light emission command unit that instructs a mode of emitted light in accordance with the function command inputs from the function command input unit;
a light emission unit that emits light in accordance with the command of the light emission command unit; and
the function command analysis system according to claim 1.

3. A presentation system comprising:
an image projection device that projects an image;
a computer that supplies the image to the image projection device;
a command device that generates an image on the image projected by the image projection device in accordance with an operator's command;
an image capturing device that captures images projected by the image projection device and images generated by the command device; and
the function command analysis system according to claim 1, wherein:
the command device comprises:
a function command input unit that inputs a function command in accordance with the operator's operation,
a light emission command unit that instructs a mode of emitted light in accordance with the function command inputs from the function command input unit, and
a light emission unit that emits light in accordance with the command of the light emission command unit.

4. A function command analysis system comprising:
an image input unit that inputs an image containing a plurality of images respectively generated by light emitted from a corresponding plurality of light-emission command transmitters;
a position information extraction unit that, for each image generated by a respective one of the plurality of light-emission command transmitters, extracts position information of that image from the image input by the image input unit;
a function command reception unit that receives, for a given image generated by light emitted from a corresponding plurality of light-emission command transmitters, data indicative of which of the light emission command transmitters emitted light for generating that image and a function command transmitted by that light-emission command transmitter; and
a function command output unit that outputs that data indicative of which of the light emission command transmitters emitted light for generating the given image, the position information extracted by the position information extraction unit and the function command received by the function command reception unit.

5. The function command analysis system according to claim 4, further comprising:
a function command specification unit that extracts a mode of the image generated by the light emitted from the light-emission command transmitter, from the image input by the image input unit to specify a function command input by an operator of the light-emission command transmitter.

6. A function command system comprising:
a function command input unit that inputs a function command in accordance with an operator's operation;
a function command transmission unit that transmits the function command input from the function command input unit;
a light emission command unit that instructs to emit light in accordance with the function command input from the function command input unit;
a light emission unit that emits light in accordance with the command of the light emission command unit; and
the function command analysis system according to claim 4.

7. A presentation system comprising:
an image projection device that projects an image;
a computer that supplies the image to the image projection device;
a command device that generates an image on the image projected by the image projection device in accordance with an operator's command;
an image capturing device that captures the image projected by the image projection device and the image generated the command device; and
the function command analysis system according to claim 4, wherein:
the command device comprises:
a function command input unit that inputs a function command in accordance with the operator's operation;
a function command transmission unit that transmits the function command input from the function command input unit;
a light emission command unit that instructs to emit light in accordance with the function command input from the function command input unit; and
a light emission unit that emits light in accordance with the command of the light emission command unit.

8. A function command device comprising:
a function command input unit that inputs a function command in accordance with an operator's operation;
a function command transmission unit that transmits the function command input from the function command input unit;
a light emission command unit that instructs to emit light in accordance with the function command input from the function command input unit; and
a light emission unit that emits light in accordance with the command of the light emission command unit, wherein the light emission unit emits light having a plurality of modes, the plurality of modes including:
(i) a first mode indicative of the function command input; and
(ii) a second mode for allowing identification of the light emission unit among a plurality of light emission units.

9. A computer readable medium storing a program causing a computer to execute a process for analyzing a function command, the process comprising:
inputting an image containing a plurality of images respectively generated by light emitted from a corresponding plurality of light emission devices;
extracting position information of each of the images which are respectively generated by the light emitted from the light emission devices, from a differential image generated from the input images;
for a given one of the images, extracting a plurality of modes of the image, which is generated by the light emitted from the light emission device, from one of the input images, wherein the plurality of modes includes:
(i) a first mode indicative of a function command input by an operator; and
(ii) a second mode indicative of which of the plurality of light emission devices emitted light for generating that image; and outputting the extracted position information and the specified function command.

10. A computer readable medium storing a program causing a computer to execute a process for analyzing a function command, the process comprising:

inputting an image containing a plurality of images respectively generated by light emitted from a corresponding plurality of light-emission command transmitters;

extracting position information of each image generated by the light, which is emitted from the light-emission command transmitters, from the input image;

receiving, for a given one of the image generated by light emitted from a corresponding plurality of light-emission command transmitters, data indicative of which of the light emission command transmitters emitted light for generating the image and a function command transmitted from the light-emission command transmitter; and outputting the data indicative of which of the light emission command transmitters emitted light for generating the given image, the extracted position information and the received function command.

* * * * *